(12) United States Patent
Taguchi

(10) Patent No.: US 11,022,182 B2
(45) Date of Patent: Jun. 1, 2021

(54) METHOD FOR ASSEMBLING CRUCIFORM UNIVERSAL JOINT, AND CRUCIFORM UNIVERSAL JOINT

(71) Applicant: NSK LTD., Tokyo (JP)

(72) Inventor: Yuichiro Taguchi, Maebashi (JP)

(73) Assignee: NSK LTD., Tokyo (JP)

( * ) Notice: Subject to any disclaimer, the term of this patent is extended or adjusted under 35 U.S.C. 154(b) by 400 days.

(21) Appl. No.: 16/072,252

(22) PCT Filed: Jan. 24, 2017

(86) PCT No.: PCT/JP2017/002273
§ 371 (c)(1),
(2) Date: Jul. 24, 2018

(87) PCT Pub. No.: WO2017/130938
PCT Pub. Date: Aug. 3, 2017

(65) Prior Publication Data
US 2019/0024724 A1  Jan. 24, 2019

(30) Foreign Application Priority Data

Jan. 28, 2016 (JP) .............................. JP2016-014097
Feb. 29, 2016 (JP) .............................. JP2016-036510

(51) Int. Cl.
*F16D 3/38* (2006.01)
*F16D 3/26* (2006.01)
(Continued)

(52) U.S. Cl.
CPC .............. *F16D 3/385* (2013.01); *B62D 1/192* (2013.01); *F16D 3/06* (2013.01); *F16D 3/26* (2013.01);
(Continued)

(58) Field of Classification Search
CPC ... F16D 3/385; F16D 3/26; F16D 3/06; B62D 1/192; Y10T 29/49913; Y10T 29/49909; F16C 2361/41
(Continued)

(56) References Cited

U.S. PATENT DOCUMENTS

| | | | | |
|---|---|---|---|---|
| 1,840,764 A | * | 1/1932 | Brown ................... | B21D 51/40 29/508 |
| 7,115,037 B2 | * | 10/2006 | Schlegelmann ........ | F16D 3/405 464/130 |
| 2012/0311845 A1 | | 12/2012 | Taniguchi et al. | |

FOREIGN PATENT DOCUMENTS

| | | |
|---|---|---|
| EP | 2 719 925 A1 | 4/2014 |
| JP | 47-12561 B | 4/1972 |

(Continued)

OTHER PUBLICATIONS

Communication dated May 14, 2019, from the Japanese Patent Office in counterpart application No. 2017-564256.
(Continued)

*Primary Examiner* — Greg Binda
(74) *Attorney, Agent, or Firm* — Sughrue Mion, PLLC

(57) ABSTRACT

After a cup bearing (13a) is incorporated into a circular hole (11c) of a coupling arm portion (10c) forming a yoke, a notch (25) having a V-shaped cross section is formed in a portion near the periphery of the circular hole (11c) on an outer side surface of the coupling arm portion (10c). Thereafter, a thin-walled portion (27) having a substantially trapezoidal cross section formed in a radially inner portion of the notch (25) in an opening edge portion of the circular hole (11c) is plastically deformed inward in a radial direction to form a staking portion (14a). Therefore, it is possible to achieve a method of assembling a joint cross type universal joint and a joint cross type universal joint which (Continued)

can form the staking portion for preventing the cup bearing from falling off without complicating the staking work.

6 Claims, 10 Drawing Sheets

(51) Int. Cl.
  *B62D 1/19* (2006.01)
  *F16D 3/06* (2006.01)
(52) U.S. Cl.
  CPC ..... *F16C 2361/41* (2013.01); *Y10T 29/49909* (2015.01); *Y10T 29/49913* (2015.01)
(58) Field of Classification Search
  USPC .......................................................... 464/130
  See application file for complete search history.

(56) References Cited

FOREIGN PATENT DOCUMENTS

| JP | 10-205547 A | 8/1998 |
| JP | 2003028188 A | 1/2003 |
| JP | 2006-234114 A | 9/2006 |
| JP | 2010-242855 A | 10/2010 |
| JP | 5333597 B2 | 11/2013 |
| JP | 2014-202262 A | 10/2014 |
| JP | 2015-117760 A | 6/2015 |
| JP | 2015-117761 A | 6/2015 |

OTHER PUBLICATIONS

Search Report dated May 9, 2017, issued by the International Searching Authority in counterpart International Patent Application No. PCT/JP2017/002273 (PCT/ISA/210).

Communication dated Oct. 8, 2018, issued by the European Patent Office in counterpart European Application No. 17744168.0.

* cited by examiner

METHOD FOR ASSEMBLING CRUCIFORM UNIVERSAL JOINT, AND CRUCIFORM UNIVERSAL JOINT

TECHNICAL FIELD

The present invention relates to a method of assembling a joint cross type universal joint and the joint cross type universal joint which is incorporated in a steering device for transmitting movement of a steering shaft to a steering gear, for example.

BACKGROUND ART

A steering device of an automobile is configured, for example, as illustrated in FIG. 12. The movement of a steering wheel 1 is transmitted to a steering gear unit 4 via a steering shaft 2 and an intermediate shaft 3, and wheels are steered with the steering gear unit 4. Usually, the steering shaft 2 and an input shaft 5 of the steering gear unit 4 cannot be provided on the same straight line (coaxially) with each other. For this purpose, from the related art, the intermediate shaft 3 is provided between the steering shaft 2 and the input shaft 5, and both end portions of the intermediate shaft 3 and the end portions of the steering shaft 2 and the input shaft 5 are coupled via universal joints 6 and 6 called a cardan joint, respectively. As a result, the rotational force can be transmitted between the steering shaft 2 and the input shaft 5, which do not exist on the same straight line.

FIG. 13 illustrates an example of a universal joint known in the related art described in Patent Document 1. A universal joint 6 is formed by coupling a pair of yokes 7a and 7b via a joint cross 8 to be able to transmit torque. Each of the yokes 7a and 7b is made by subjecting a metal material to a press working or a forging process. Each of the yokes 7a and 7b has base portions 9a and 9, and a pair of coupling arm portions 10a and 10b for each of the yokes 7a and 7b. Respective circular holes 11a and 11b are formed concentrically with each other for each of the yokes 7a and 7b, at the distal ends of the respective coupling arm portions 10a and 10b. The joint cross 8 is formed by providing the four shaft portions 12 and 12 such that the central axes of the adjacent shaft portions 12 and 12 are orthogonal to each other. The shaft portions 12 and 12 are supported inside the circular holes 11a and 11b to be freely rotatable via cup bearings 13 and 13 which are shell type radial needle bearings, respectively. In order to prevent the cup bearings 13 and 13 from slipping outward from the circular holes 11a and 11b, staking portions 14 and 14 are formed at the opening edge portions of the circular holes 11a and 11b.

Incidentally, in order to assemble the universal joint 6 having the above-described configuration, after assembling the cup bearing 13 to the portion between the circular hole 11a (11b) and the end portion of the shaft portion 12, an operation of plastically deforming a plurality of places of the opening edge portion of the circular hole 11a (11b) among the outer side surface of the coupling arm portion 10a (10b) to form the staking portion 14 in the portion is performed. The forming operation of the staking portion 14 is conventionally performed by an operation of pressing a staking punch against the opening edge portion of the circular hole 11a (11b). In order to obtain a desired shape as the staking portion 14, an operation of causing a staking punch to vigorously protrude (perform shockingly) is performed. This is because when the staking punch is slowly pressed against the opening edge portion of the circular hole 11a (11b), the cross-sectional area of the portion to be plastically deformed increases, and plastic deformation is hard to occur. Therefore, in the case of performing the assembling method of the related art, when the staking punch is pressed, there is a possibility that the coupling arm portion 10a (10b) is flexibly deformed inward, and the axial position between the circular hole 11a (11b) and the cup bearing 13 may be displaced due to influences such as inertia. When a displacement in the axial direction occurs, the preload load of the cup bearing 13 may change. For this reason, it is necessary to take measures such as formation of the staking portion 14, while suppressing the cup bearing 13 and the coupling arm portion 10a (10d) so that the position of the circular hole 11a (11b) and the cup bearing 13 do not deviate. In that case, the staking operation becomes complicated (troublesome), and there is a possibility that the assembling time of the universal joint 6 becomes longer. Further, as described above, when the staking portion 14 is formed by causing the staking punch to vigorously collide, the formation position of the staking portion 14 in the axial direction is liable to vary. Furthermore, since the staking portions 14 are formed one by one, there is also a problem that the assembling time (staking processing time) becomes longer.

RELATED ART REFERENCE

Patent Document

Patent Document 1: JP-A-H10-205547

SUMMARY OF THE INVENTION

Problems to be Solved by the Invention

The present invention has been made in view of the above circumstances, and an object thereof is to provide a method of assembling a joint cross type universal joint which can form a staking portion for preventing a cup bearing from falling out without complicating the staking work, and a joint cross type universal joint.

Means for Solving the Problems

According to a method of assembling a joint cross type universal joint of the invention, after a cup bearing (for example, a shell type radial needle bearing) is incorporated in a portion between a circular hole formed in a coupling arm portion forming a yoke and an end portion of a shaft portion forming a joint cross inserted inside the circular hole, an opening edge portion of the circular hole on an outer side surface of the coupling arm portion is plastically deformed inward in the radial direction to form a staking portion.

In particular, in the case of the present invention, first, a notch (cutout) is formed in a portion (at least not open to the inner circumferential surface of the circular hole) near the periphery of the circular hole on the outer side surface of the coupling arm portion. After that, a thin-walled portion formed in a radially inner portion of the notch in the opening edge portion of the circular hole is plastically deformed inward in a radial direction to form a staking portion.

When carrying out the present invention, the notch may be formed by cutting using a cutting tool, or may be formed by press working using a punch.

When carrying out the present invention, the cross-sectional shape of the notch is not particularly limited, but it is possible to adopt a shape such as a V shape, a U shape, and an I shape.

In the case where the V-shape is adopted as a cross-sectional shape of the notch (the radially outer side surface of the notch is inclined), it is possible to easily secure the escape of the material occurring at the time of notching process, and it is possible to easily insert the leading end portion of the staking tool into the notch when the thin-walled portion is plastically deformed inward in the radial direction In the case of carrying out the method of assembling the cross joint type universal joint of the present invention, for example, the formation of the notch may be performed after the cup bearing is incorporated in the portion between the circular hole and the end portion of the shaft portion.

Alternatively, the formation of the notch may be performed before the cup bearing is assembled on the portion between the circular hole and then end portion of the shaft portion.

In the case of carrying out the assembling method of the cross joint type universal joint according to the invention, for example, a plurality of notches are formed in the portion near the periphery of the circular hole on the outer side surface of the coupling arm portion. Thereafter, a plurality of thin-walled portions each formed in radially inner portions of the plurality of notches in the opening edge portion of the circular hole can be plastically deformed inward in the radial direction at the same time.

In this case, the plurality of notches may be formed at equal intervals in the circumferential direction in the portion near the periphery of the circular hole, or may be formed at irregular intervals in the circumferential direction.

Alternatively, when carrying out the assembling method of the cross joint type universal joint of the invention, for example, in the portion near the periphery of the circular hole on the outer side surface of the coupling arm portion, an annular notch is formed to surround the circular hole. Thereafter, the annular thin-walled portion formed at the opening edge portion of the circular hole can be plastically deformed inward in the radial direction in the radially inner portion of the notch.

In this case, it is possible to plastically deform a plurality of portions in the circumferential direction in the annular thin-walled portion inward in the radial direction or to plastically deform the whole (the entire circumferential range) inward in the radial direction. In the case of plastically deforming a plurality of portions in the circumferential direction, for example, the equally spaced positions may be plastically deformed in the circumferential direction, or the irregularly spaced positions may be plastically deformed in the circumferential direction.

A joint cross type universal joint of the invention includes a pair of yokes and a joint cross which couples the yokes so as to be swingably displaceable.

The pair of yokes includes a base portion, a pair of coupling arm portions extending in an axial direction from two positions on opposite sides in an radial direction at one end portion of the base portion in an axial direction, and a pair of circular holes formed concentrically with each other at leading end portions of the pair of coupling arm portions.

The joint cross includes four shaft portions provided in a state in which central axes of adjacent shaft portions are orthogonal to each other.

A cup bearing is incorporated in a portion between the circular hole formed in the coupling arm portion and an end portion of a shaft portion of the joint cross.

In particular, in the case of the invention, a notch is formed in a portion near the periphery of the circular hole on the outer side surface of the coupling arm portion.

A staking portion which extends inward in the radial direction from the circular hole to prevent the cup bearing from falling off from the circular hole is formed at an opening edge portion of the circular hole on the outer side surface of the coupling arm portion and on a radially inner portion of the notch.

The radially outer side surface forming the notch forms an inclined surface which is inclined outward in the radial direction toward the outer side surface of the coupling arm portion.

Advantages of the Invention

According to the assembling method of the cross joint type universal joint of the invention configured as described above, it is possible to form a staking portion for preventing the cup bearing from falling off, without complicating the staking operation.

That is, in the case of the invention, after forming a notch in the portion near the periphery of the circular hole on the outer side surface of the coupling arm portion, a thin-walled portion formed in the radially inner portion of the notch in the opening edge portion of the circular hole is plastically deformed inward in the radial direction to obtain a staking portion. Therefore, compared to the case where such a notch is not formed, the staking load at the time of forming the staking portion can be reduced. Therefore, when forming the staking portion, a desired staked shape can be obtained without causing the staking tool to vigorously collide with the thin-walled portion (even when slowly and statically colliding). Thus, in the case of the invention, since it is unnecessary to bend and deform the coupling arm portion when forming the staking portion, it is not necessary to take measures such as suppressing the cup bearing and the coupling arm portion, and it is possible to effectively prevent the axial position between the circular hole and the cup bearing from shifting. Thus, it is possible to prevent the staking operation from becoming complicated, and it is possible to shorten the assembling time of the joint cross type universal joint. In the case of the invention, it is possible to effectively prevent occurrence of variations in the shape, formation position, and the like of the staking portion to be obtained by regulating the shape, depth, formation position, and the like of the notch. Furthermore, in the case of the invention, as described above, since the staking load can be reduced, it is possible to perform the staking deformation of a plurality of thin-walled portions at the same time, and it is also possible to shorten of the assembly time (cycle time) from this aspect.

Further, according to the cross joint type universal joint of the invention, since the radially outer side surface forming the notch constitutes an inclined surface which is inclined radially outward toward the outer side surface of the coupling arm portion, it is possible to easily ensure the escape of the material occurring at the time of notching, and it is possible to easily insert the leading end portion of the staking tool used for the staking process into the notch.

BRIEF DESCRIPTION OF THE DRAWINGS

FIGS. 6A and 6B are enlarged views of a portion corresponding to a part VI of FIG. 2, wherein FIG. 6A illustrates a state after the notching process and FIG. 6B illustrates a state after the staking process.

MODES FOR CARRYING OUT THE INVENTION

First Embodiment

Figure 12:
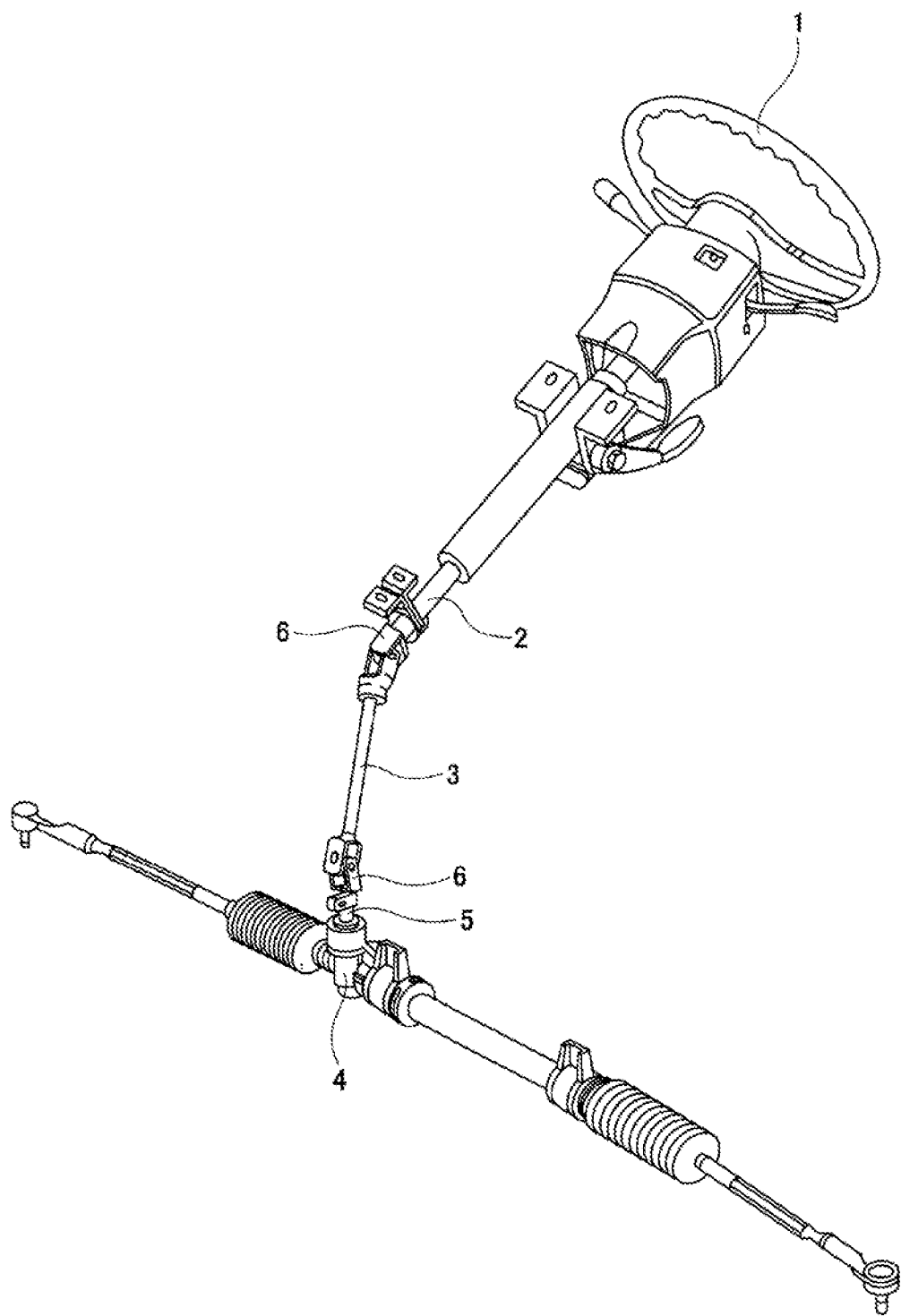
FIG. 12 is a perspective view illustrating an example of a steering device which is incorporated with a universal joint to be assembled according to the invention.
Figure 13:
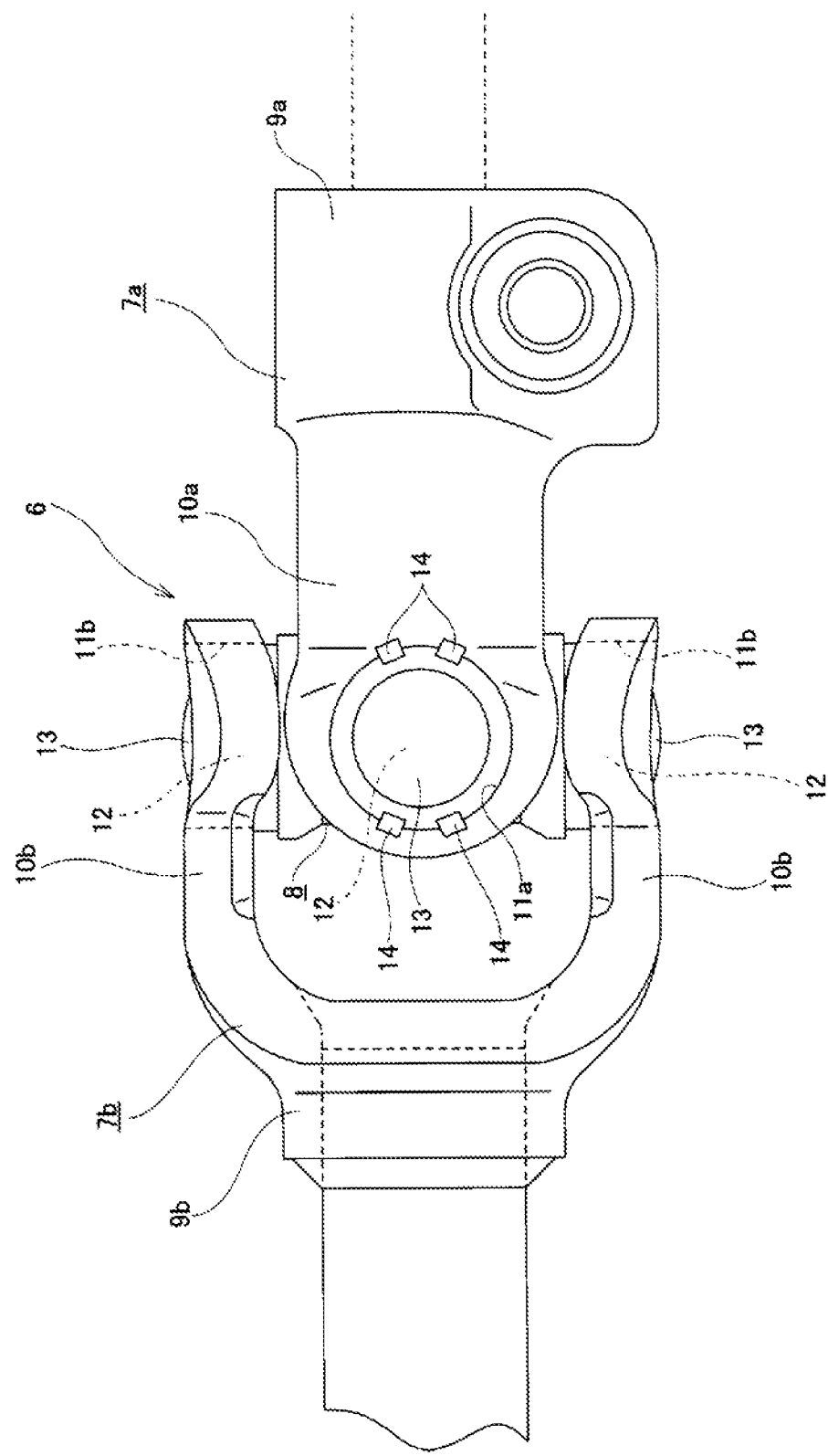
FIG. 13 is a side view illustrating an example of a universal joint known from the related art.

A first embodiment of the present invention will be described with reference to FIGS. 1 to 6B. In the illustrated steering device for the automobile, a steering shaft 2a with a steering wheel 1 (see FIG. 12) fixed to a rear end portion is supported inside a cylindrical steering column 15 to be freely rotatable. When steering, the movement of the steering wheel 1 is transmitted to the input shaft 5 (see FIG. 12) of the steering gear unit 4 via the steering shaft 2a, an electric assist device 16, a universal joint 6a, an intermediate shaft 3a and another universal joint 6b. When the input shaft 5 rotates, a pair of tie rods arranged on both sides of the steering gear unit 4 is pushed and pulled, and a steering angle according to the operation amount of the steering wheel 1 is imparted to the pair of left and right steered wheels.

Figure 1:
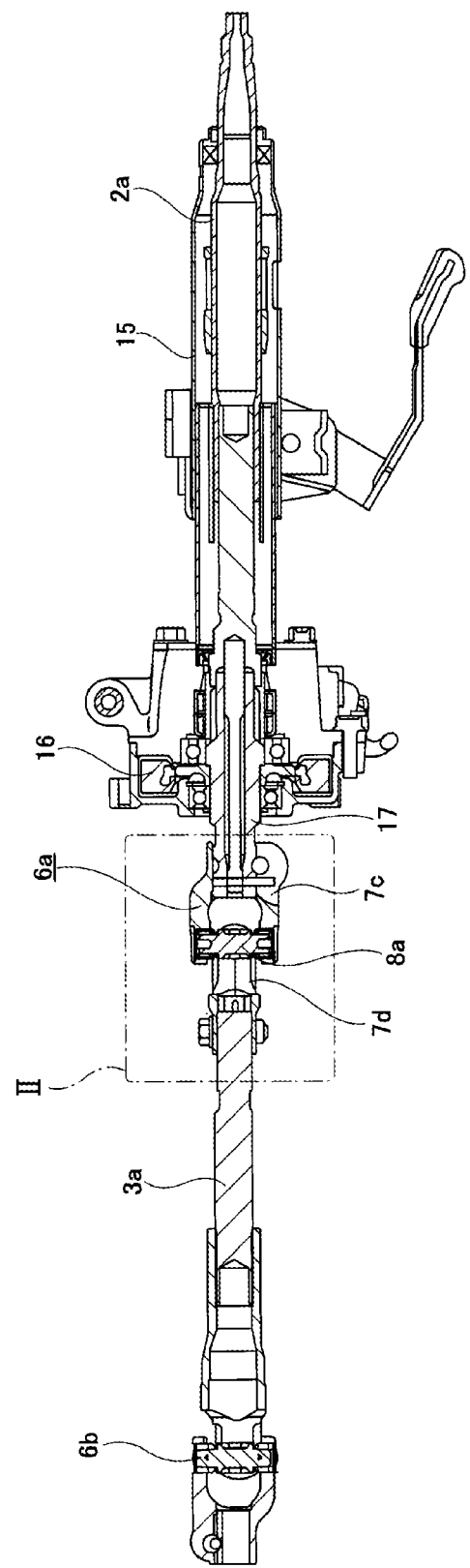
FIG. 1 is a cross-sectional view of a steering device for an automobile illustrating a first embodiment of the invention.
Figure 2:
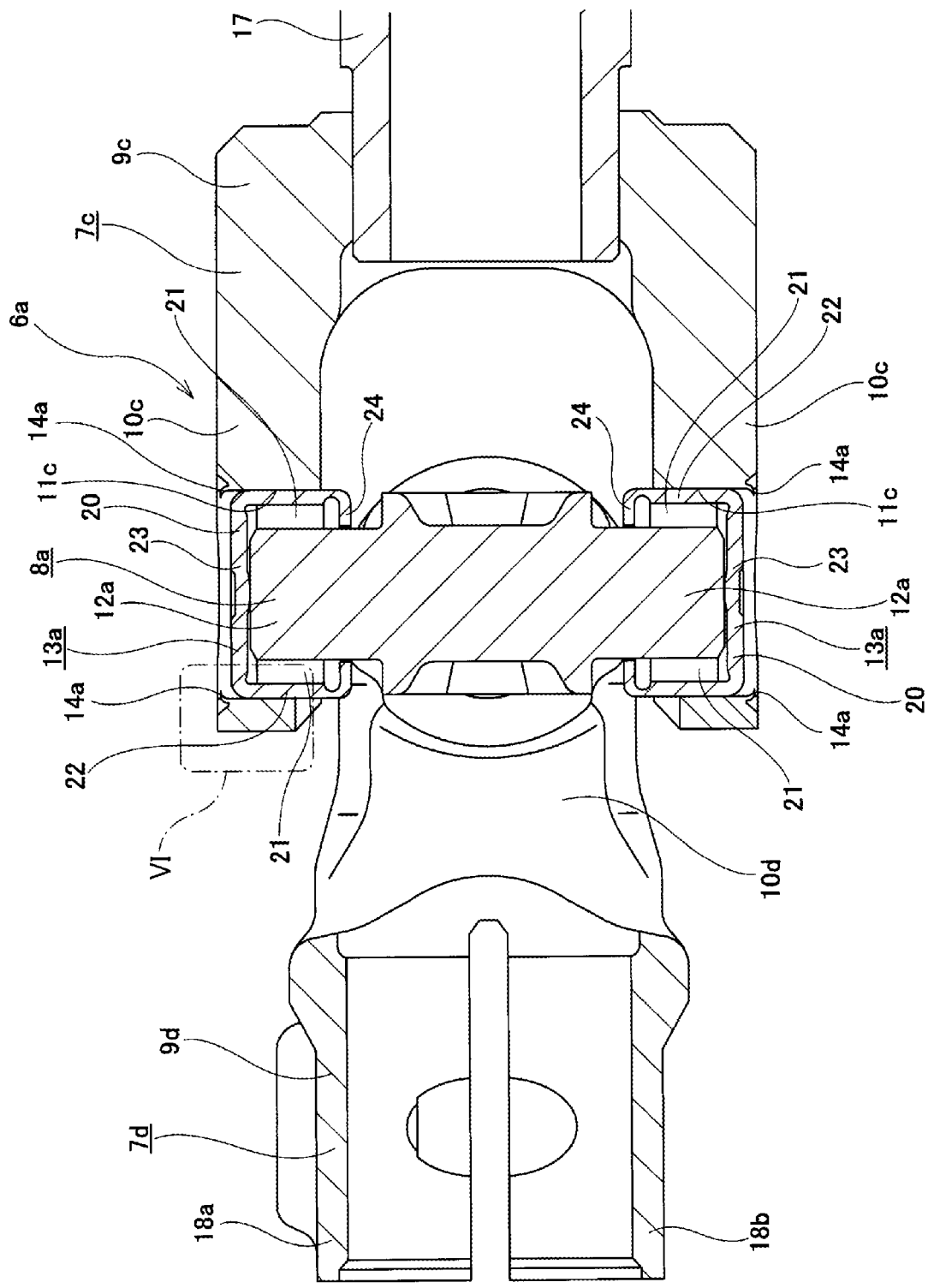
FIG. 2 is an enlarged view of a universal joint corresponding to a part II of FIG. 1.
Figure 3:
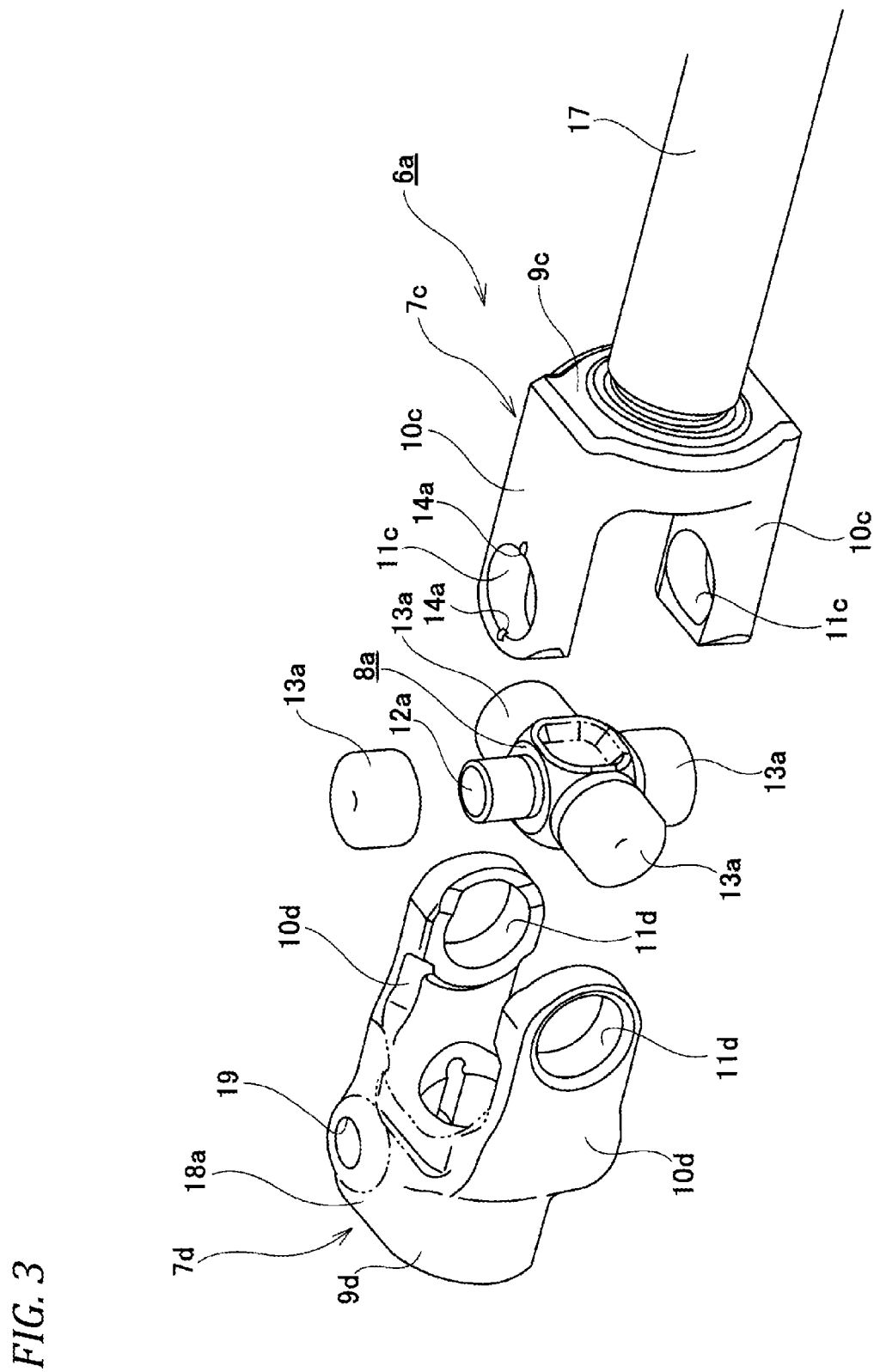
FIG. 3 is an exploded perspective view of the universal joint.
Figure 4:
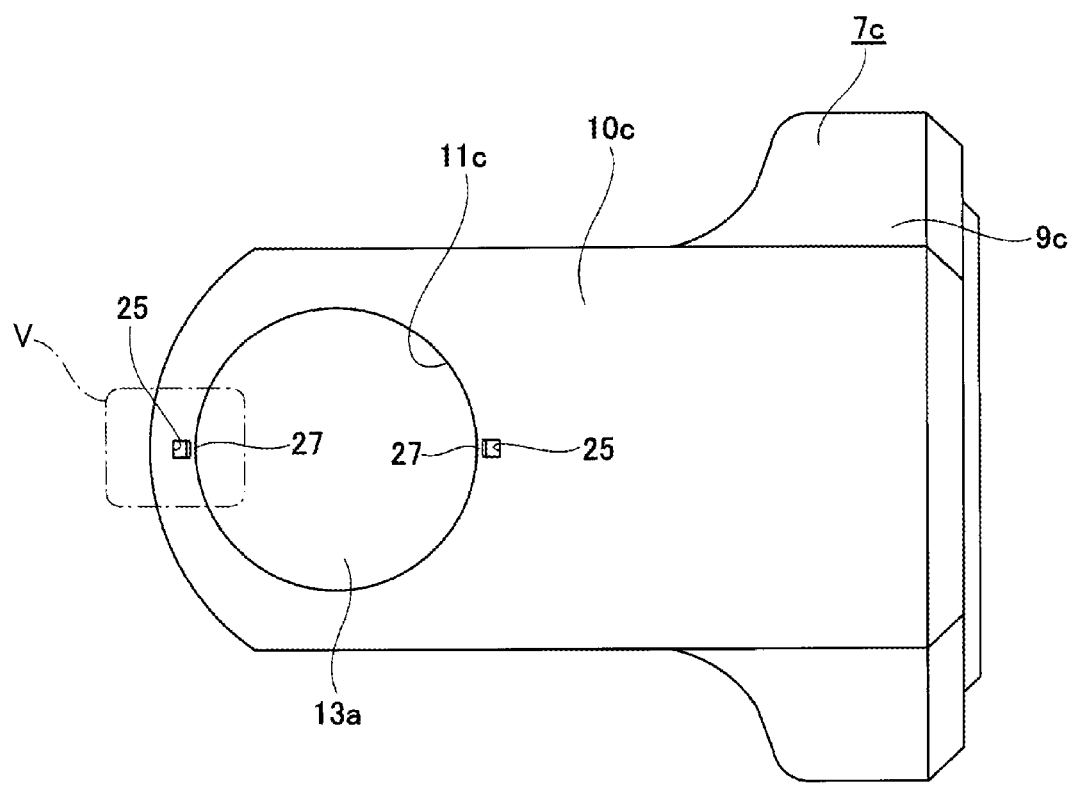
FIG. 4 is a side view of a yoke illustrating a state after a notching process and before a staking process.

All the pair of universal joints 6a and 6b incorporated in the steering device for the automobile as described above are assembling targets of the invention, but the basic configurations of the pair of universal joints 6a and 6b are the same except that the axes to be connected are different. For this reason, in the present embodiment, FIGS. 2 and 3 are added to FIG. 1, and a detailed explanation will be given only to the universal joint 6a.

The universal joint 6a is generally called a cardan joint and enables transmission of rotational force between a pair of axes which is not present on the same straight line. Accordingly, the universal joint is formed of a pair of yokes 7c and 7d made of metal (for example, made of carbon steel cast steel material), and a joint cross 8a.

One (a right side of FIGS. 2 to 3) yoke 7c includes a base portion 9c, and a pair of coupling min portions 10c and 10c extending from one axial end edge (left end edge in FIGS. 2 to 3) of the base portion 9c. In order to insert the end portion of an output shaft 17 forming the electric assist device 16, the base portion 9c is formed in a substantially cylindrical shape as a whole. Further, the coupling arm portions 10c and 10c extend in the axial direction of the base portion 9c from two positions on opposite sides in the radial direction at one end portion of the base portion 9c in the axial direction, and the inner side surfaces thereof are made to face each other. Circular holes 11c and 11c concentric with each other are formed in the leading end portions of the coupling arms 10c and 10c.

The other (a left side of FIGS. 2 to 3) yoke 7d is different from the yoke 7c only in the shape of the base portion 9d. That is, the base portion 9d is configured as a lacking cylindrical shape with one location in the circumferential direction as a discontinuous portion, and its inner diameter can be expanded or contracted. A pair of side plate portions 18a and 18b arranged substantially in parallel to each other is provided at positions different in phase by 90 degrees from the pair of coupling arm portions 10d and 10d of the base portion 9d forming the yoke 7d. A through hole 19 for inserting a rod portion of a bolt (not illustrated) is formed in one side plate portion 18a. Along with this, a screw hole for screwing the bolt is provided by press-fitting a nut into a through hole (not illustrated) formed in the other side plate portion 18b.

The joint cross 8a is formed by providing the four shaft portions 12a and 12a in a state in which the central axes of the adjacent shaft portions 12a and 12a are orthogonal to each other. Both end portions of the pair of shaft portions 12a and 12a provided on the same straight line are pivotally supported inside the circular holes 11c and 11c formed in the coupling arm portions 10c and 10c of one yoke 7c, and both end portions of the other pair of shaft portions 12a and 12a provided on a straight line are pivotally supported inside the circular holes 11d and 11d formed in the coupling arm portions 10d and 10d of the other yoke 7d. For this purpose, the leading end portions of the shaft portions 12a and 12a forming the joint cross 8a are supported inside the circular holes 11c and 11d to be freely rotatable via the cup bearings 13a and 13a, respectively.

Each cup bearing 13a corresponds to a shell type needle bearing, and includes one cup 20 corresponding to a shell type outer ring, and a plurality of needles 21 and 21. The cup 20 is formed by bending a hard metal plate by plastic working such as deep drawing process, and includes a cylindrical portion 22, a bottom portion 23, and an inward flange portion 24. The bottom portion 23 closes the entire one end side in the axial direction of the cylindrical portion 22 (the outer side surface side of the coupling arm portions 10c and 10d in the assembled state into the circular holes 11c and 11d). Further, since the inward flange portion 24 is bent inward in the radial direction from the other end side in the axial direction of the cylindrical portion 22 (the inner side surface side of the coupling arm portions 10c and 10d in the assembled state into the circular holes 11c and 11d), the inward flange portion is bent in a direction in which the surfaces facing the needles 21 and 21 are curved surfaces. Then, the respective cups 20 and 20 having the above-described configuration are press-fitted into the circular holes 11c and 11d. Further, in this state, the leading end portions of the shaft portions 12a and 12a forming the joint cross 8a are inserted into the inner sides of the respective needles 21 and 21 in the radial direction, respectively. Staking portions 14a and 14a are formed in the opening edge portions of the respective circular holes 11c and 11d, on the outer side surface of the respective coupling arm portions 10c and 10d. This prevents the cups 20 and 20 from falling off from the circular holes 11c and 11d.

When the universal joint 6a is used, in a state in which the end portion of the output shaft 17 is inserted or press-fitted into the base portion 9c forming one yoke 7c without rattling, the base portion 9c and the end portion of the output shaft 17 are welded and fixed. At the same time, in a state in which the end portion of the intermediate shaft 3a (the inner shaft forming the intermediate shaft) is engaged with the inner side of the base portion 9d forming the other yoke 7d, a leading end portion of a bolt (not illustrated), through which the rod portion is inserted into the through hole 19 formed in one side plate portion 18a, is screwed and tightened into a nut fixed to the other side plate portion 18b. Accordingly, the end portion of the intermediate shaft 3a is coupled and fixed to the base portion 9d on the basis of the operation of narrowing the interval between the side plate portions 18a and 18b and reducing the diameter of the base portion 9d. In this manner, the end portions of the output shaft 17 and the intermediate shaft 3a are connected to each other via the universal joint 6a. Therefore, the rotational force can be transmitted between the output shaft 17 and the intermediate shaft 3a, which does not exist on the same straight line.

The configuration and function of the universal joint 6a are as described above. In the case of the present embodiment, however, the forming process of the staking portion 14a which is a part of the assembling process of such a universal joint 6a is carried out as follows.

First, in the case of this embodiment, prior to the forming process of the staking portion 14a, a cup bearing 13a is incorporated into a portion between a circular hole 11c (11d) formed in the coupling arm portion 10c (10d) and the end portion of the shaft portion 12a forming the joint cross 8a inserted into the circular hole 11c (11d). For such assembling operation of the cup bearings, various methods known from the related art can be adopted. For example, it is possible to adopt a method of pushing the cup bearings 13a into the circular hole 11c (11d) from the outer side of the coupling arm portion 10c (10d), using a press-fit punch. Then, in a state in which the cup bearing 13a is press-fitted to a desired axial position, an appropriate preload is imparted to the cup bearing 13a.

In any case, after incorporating the cup bearing 13a into the circular hole 11c (11d), a notching process is performed in the portion near the periphery of the circular hole 11c (11d) on the outer side surface of the coupling arm portion 10c (10d), for example, by a cutting process using a cutting tool, a pressing process using a punch, or the like. As a result, as illustrated in FIGS. 4 to 6A, in the portion near the periphery of the circular hole 11c (11d), at two positions in the circumferential direction which are the opposite side in the radial direction of the circular hole 11c (11d) (on the center axis of the coupling arm portion 10c in the illustrated example), notches (cutouts, concave grooves, concave portions) 25 and 25 are formed.

Figure 6A:
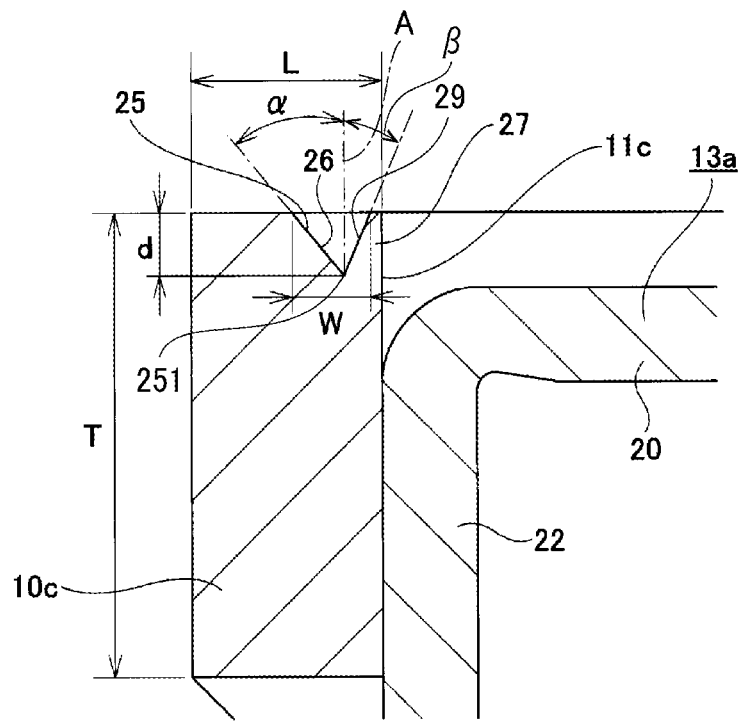

In the case of the present embodiment, the notches 25 and 25 have a V-shaped cross-sectional shape with respect to a virtual plane including the central axis of the circular hole 11c (11d), and are opened in a rectangular shape with respect to the outer side surface of the coupling arm portion 10c (10d). Further, as illustrated in FIG. 6A, a width dimension w of the opening portion of the notch 25 in the radial direction of the circular hole 11c (11d) is about ⅕ to ½ of the dimension L in the same direction of the leading end side portion than the portion with the circular hole 11c (11d) formed therein of the coupling arm portion 10c (10d). A depth dimension d of the notch 25 is about 1/10 to ⅓ of the thickness dimension T of the coupling arm portion 10c (10d). The cross-sectional shape of the notch 25 is constant in the respective tangential directions with respect to the two positions on the opposite sides in the radial direction of the circular hole 11c (11d) which is the formation position.

Further, in the case of the present embodiment, the radially outer side surface 26 that constitutes (defines) the notch 25 is inclined radially outward from the bottom portion 251 of the notch 25 toward the outer side surface of the coupling arm 10c (10d) (that is, in the illustrated example, the radially outer side surface is inclined by an angle α to the outer side in the radial direction (the side opposite to the cup bearing 13a) with respect to a line A parallel to the center axis of the circular hole 11c (11d), passing through the bottom portion 251 of the notch 25). Therefore, it is possible to easily secure the escape of the material occurring at the time of notching process, and the leading end portion of the staking tool used for the staking process to be described later can be easily inserted into the notch 25. The cross-sectional shape, the depth dimension, the formation position and the like (including the radial distance and the circumferential position from the inner circumferential surface of the circular hole 11c) of the notch 25 can be appropriately determine depending on of the shape, size, position, and the like of the staking portion 14a which are finally required.

The radially inner side surface 29 forming the notch 25 at the time of the notching process is inclined inward in the radial direction from the bottom portion 251 of the notch 25 toward the outer side surface of the coupling arm portion 10c (10d) (that is, in the illustrated example, the radially inner side surface is inclined by an angle β to the radially inner side (toward the cup bearing 13a) with respect to a line A passing through the bottom portion 251 of the notch 25 and parallel to the central axis of the circular hole 11c (11d). In the illustrated example, the angle α of the radially outer side surface 26 is larger than the angle β of the radially inner side surface 29.

As the notches 25 and 25 are formed as described above, the radially inner portions of the notches 25 and 25 (the portions adjacent to the radially inner side) among the opening edge portions of the circular hole 11c (11d), thin-walled portions 27 and 27 are formed, respectively. In other words, by forming the notches 25 and 25 in the portion near the periphery of the circular hole 11c (11d), the thin-walled portions 27 and 27 are made to remain as unprocessed portions in the portion between the notches 25 and 25 and the inner circumferential surface of the circular hole 11c (11d). Therefore, among the thin-walled portions 27 and 27, the radially inner side surface is formed by a part of the inner circumferential surface of the circular hole 11c (11d), and the radially outer side surface is formed by the radially inner side surfaces (whole) 29 of the notches 25 and 25. In the illustrated example, the cross-sectional shape of the thin-walled portions 27 and 27 with respect to the imaginary plane including the central axis of the circular hole 11c (11d) is substantially trapezoidal, and the wall thickness in the radial direction of the circular hole 11c (11d) is smaller toward the outer side surface side of the coupling arm portion 10c (10d). However, the thickness of the thin-walled portions 27 and 27 with respect to the radial direction of the circular hole 11c (11d) can also be constant over the depth direction of the notches 25 and 25. Specifically, the wall thickness of the circular hole 11c (11d) in the radial direction at the end portion on the outer side surface side of the coupling arm portion 10c (10d) among the thin-walled portions 27 and 27 is 0 or more, the dimension L is about ⅕ or less, and similarly, the wall thickness in the radial direction of the circular hole 11c (11d) on the inner side surface side end portion is about 1/10 to ⅓ of the dimension L.

Figure 6B:
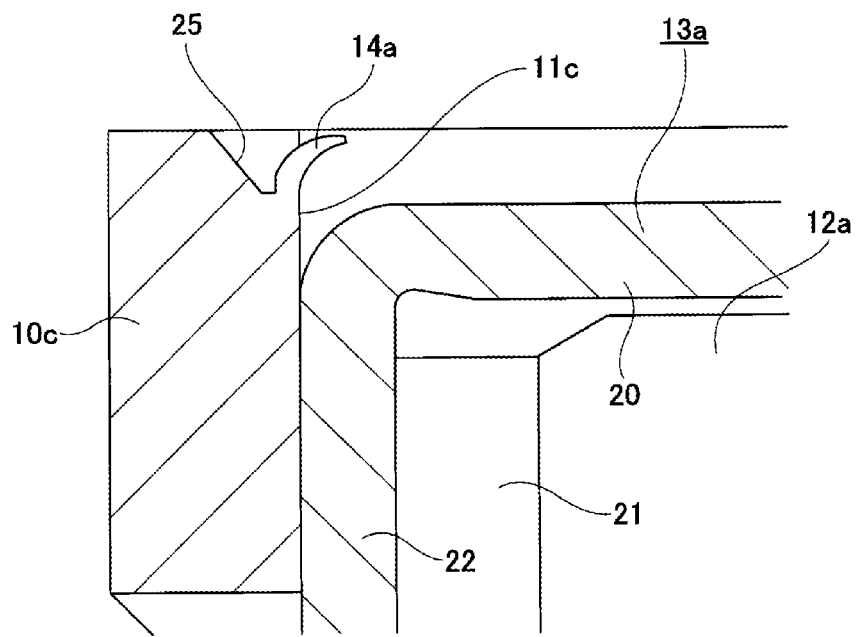

As described above, when the notches 25 and 25 are formed in the portion near the periphery of each of the circular holes 11c (11d) and the thin-walled portions 27 and 27 are formed in the radially inner portions of these notches 25 and 25 thereafter, the thin-walled portions 27 and 27 are plastically deformed inward in the radial direction. More specifically, the leading end portions of the staking tools (not illustrated) are simultaneously inserted into the notches 25 and 25, and the radially outer side surfaces of the thin-walled portions 27 and 27, which are the radially inner side surfaces of the notches 25 25, are simultaneously pressed downward and rightward (right obliquely lower side) of FIG. 6A. As a result, the thin-walled portions 27 and 27 are plastically deformed inward in the radial direction to obtain the staking portion 14a as illustrated in FIG. 6B. Therefore, the staking portion 14a extends radially inward from a portion of the circular hole 11c (11d) in which the staking portion 14a is not formed.

According to the assembling method of the universal joint 6a having the above-described configuration, the staking portion 14a can be formed without complicating the staking operation.

That is, in the case of the present embodiment, after the notches 25 and 25 are formed in the circumferential portion of the circular hole 11c (11d) on the outer side surface of the coupling arm portion 10c (10d), the thin-walled portions 27 and 27 each formed in the radially inner portions of the notches 25 and 25 among the opening edge portions of the circular hole 11c (11d) are plastically deformed inward in the radial direction to obtain staking portions 14a and 14a. Therefore, as compared with a case where the notch as in the present embodiment is not formed, the cross-sectional shape of the thin-walled portions 27 and 27, which are portions to be plastically deformed, can be made sufficiently small. Thus, it is possible to reduce the staking load at the time of forming the staking portions 14a and 14a. Therefore, when forming these staking portions 14a and 14a, as desired staking shape can be obtained without causing the staking tool to vigorously collide with the thin-walled portions 27 and 27 (even when slowly and statically abutting). Therefore, in the case of the present embodiment, since the coupling arm portion 10c (10d) is not flexibly deformed inward when forming the staking portions 14a and 14a, it is possible to effectively prevent the axial position of the circular hole 11c (11d) and the cup bearing 13a from deviating from each other, even when not taking countermeasures such as suppression of the rotation of the cup bearing 13a and the coupling arm portion 10c (10d). For this reason, it is possible to prevent the staking operation from becoming complicated, and it is possible to shorten the assembling operation time of the universal joint 6a. In the case of the present embodiment, it is possible to effectively prevent the occurrence of variations in the shape, formation position, and the like of the staking portion 14a by regulating the shape, depth, formation position, and the like of the notch 25. Furthermore, in the case of this embodiment, since the staking load can be reduced as described above, the two thin-walled portions 27 and 27 can be staked and deformed at the same time, and it is also possible to shorten the assembling work time (cycle time) from this viewpoint.

Figure 7A:
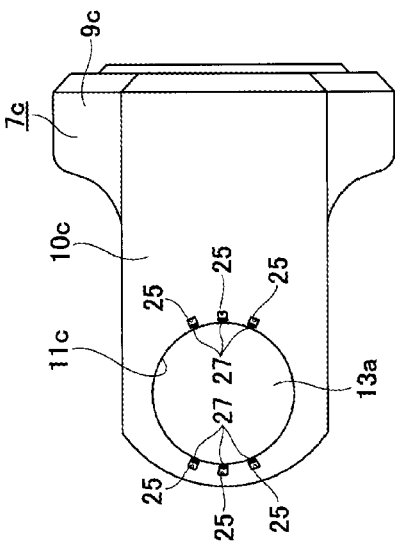
FIGS. 7A to 7C are views corresponding to FIG. 4 illustrating three examples of modified examples of the first embodiment of the invention.
Figure 7B:
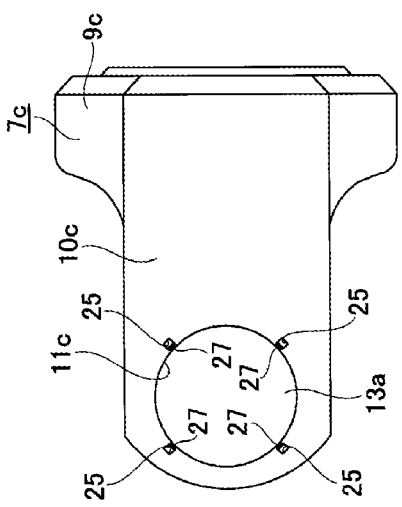
Figure 7C:
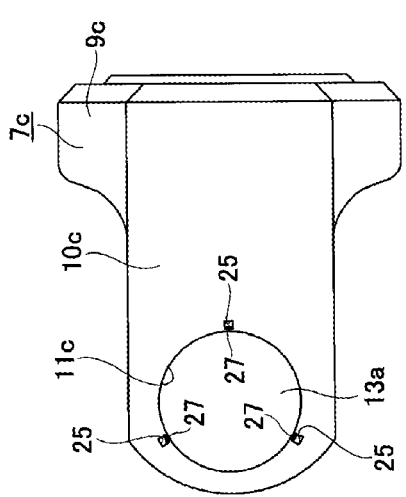

FIGS. 7A to 7C illustrate a structure in which the formation positions of the notches 25 and 25 (the thin-walled portions 27 and 27) are changed as a modified example of the present embodiment. In FIG. 7A, the notches 25 and 25 are formed at three positions equally spaced in the circumferential direction among the vicinity portions of the circumference of the circular hole 11c (11d). In FIG. 7B, the notches 25 and 25 are formed at four positions equally spaced in the circumferential direction among the vicinity portions of the circumference of the circular hole 11c (11d). Furthermore, in FIG. 7C, a total of six notches 25 and 25 including three notches at each of the two portions on the radially opposite side of the circular hole 11c (11d) among the vicinity portions of the circumference of the circular hole 11c (11d) are formed. When carrying out this embodiment, in consideration of the size of the cup bearings 13a, the ease of falling off and the like, it is possible to appropriately change the formation position and the number of formation of the notches 25 and thus the staking portions 14a, as in the above modified example. As in the present embodiment and FIGS. 7A and 7B, the notches 25 and 25 may be formed at equal intervals in the circumferential direction, or as illustrated in FIG. 7C, the notches 25 and 25 may be formed at irregular intervals in the circumferential direction.

Second Embodiment

Figure 8:
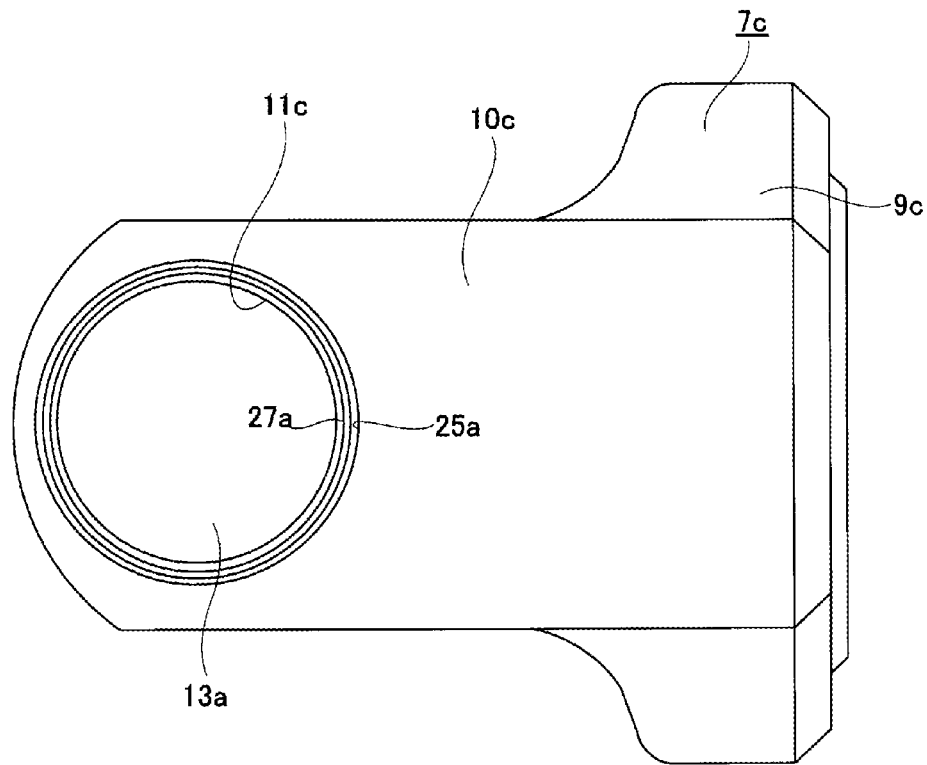
FIG. 8 is a view illustrating a second embodiment of the invention, corresponding to FIG. 4.

A second embodiment of the invention will be described with reference to FIG. 8. In the present embodiment, an annular notch 25a is formed in the portion near the periphery of the circular hole 11c (11d) on the outer side surface of the coupling arm portion 10c (10d) so as to surround the circular hole 11c (11d). As a result, an annular thin-walled portion 27a is formed at the opening edge portion of the circular hole 11c (11d) at the radially inner portion of the notch 25a. In the case of the present embodiment, the thinned portion 27a is plastically deformed inward in the radial direction, thereby forming the staking portion 14a (see FIGS. 2, 6A, and the like).

In the case of the present embodiment having the configuration as described above, by forming the notch 25a by cutting work, the notch 25a can be machined in one process. Therefore, as in the case of the first embodiment described above, it is possible to reduce the number of notching processes, as compared with the case where the machining processes are required for the number of notches to be formed.

Further, in the case of carrying out this embodiment, it is possible to plastically deform a plurality of portions of the annular thin-walled portion 27a in the circumferential direction inward in the radial direction, or to plastically deform a whole (the entire circumference range) inward in the radial direction. When plastically deforming a plurality of locations in the circumferential direction, for example, the equally spaced positions may be plastically deformed in the circumferential direction, or the irregularly spaced positions may be plastically deformed in the circumferential direction. Other configurations and operational effects are the same as those of the case of the first embodiment.

Third Embodiment

Figure 9:
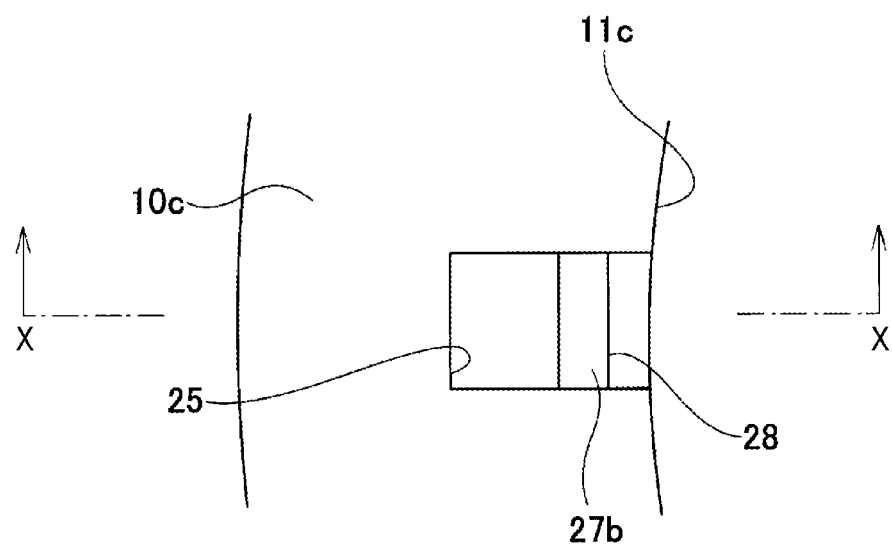
FIG. 9 is a view illustrating a third embodiment of the invention, corresponding to FIG. 5.
Figure 10:
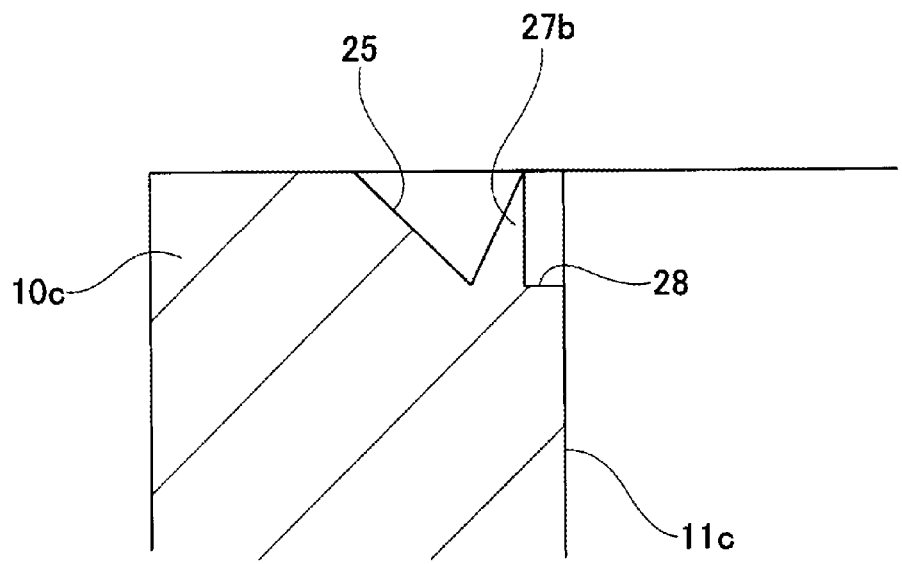
FIG. 10 is a cross-sectional view taken along the line X-X of FIG. 9.

A third embodiment of the invention will be described with reference to FIGS. 9 and 10. In the case of this embodiment, before or after the machining process of the notch 25, or simultaneously with the machining process of the notch 25, a notched portion (recessed portion) 28 opened to the inner circumferential surface of the circular hole 11c (11d) and the outer side surface of the coupling arm portion 10c (10d) is formed in a portion in which the formation position of the notch 25 matches the phase in the circumferential direction, in the opening edge portion of the circular hole 11c (11d). In the illustrated example, the notched portion 28 has a substantially rectangular cross-sectional shape with respect to a virtual plane including the central axis of the circular hole 11c (11d), and the depth dimension thereof is substantially the same as the depth dimension of the notch 25. The opening width of the notched portion 28 in the circumferential direction of the circular hole 11c (11d) is the same as the opening width in the same direction of the notch 25.

In the case of the present embodiment having the configuration as described above, by forming the notched portion 28, it is possible to further reduce the cross-sectional area of the thin-walled portion 27b formed in the radially inner portion of the notch 25. For this reason, it is possible to further reduce the staking load required for plastically deforming the thin-walled portion 27b inward in the radial direction. Other configurations and operational effects are the same as those in the case of the first embodiment.

Fourth Embodiment

Figure 5:
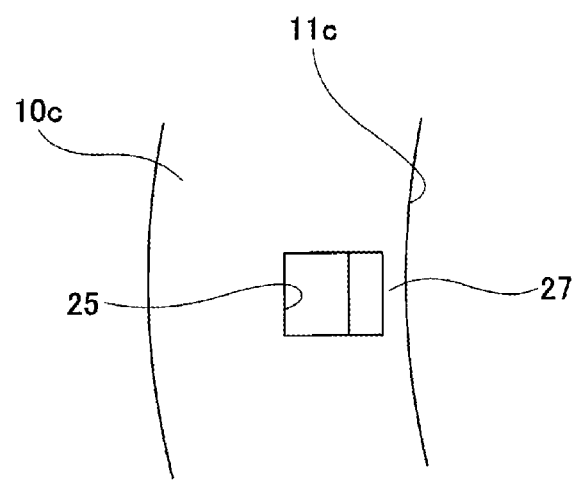
FIG. 5 is an enlarged view of a part V of FIG. 4.
Figure 11:
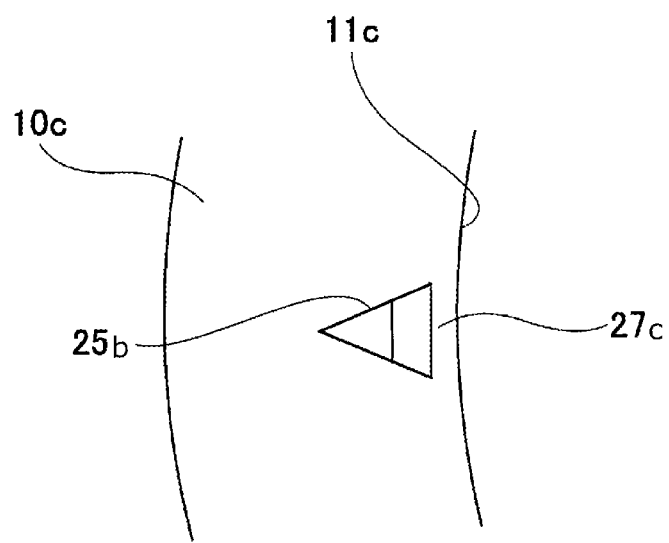
FIG. 11 is a view illustrating a fourth embodiment of the invention, corresponding to FIG. 5.

A fourth embodiment of the invention will be described with reference to FIG. 11. The shape of the notch 25 opened to the outer side surface of the coupling arm portion 10c (10d) illustrated in FIG. 5 is a rectangular shape. Meanwhile, in the case of the present embodiment, the same shape of the notch 25b is formed in a triangular shape. By forming the notch in the triangular shape, the area becomes smaller than the rectangular shape, and the resistance at the time of machining the notch 25b can be reduced. Furthermore, when the notch 25b is machined by the two oblique sides of the triangular shape, the annealed portion easily becomes closer to the side of the circular hole 11c, which makes it possible to easily deform the deformation when plastically deformed in the radial direction of the thin-walled portion 27, which is the next process.

INDUSTRIAL APPLICABILITY

It is to be noted that the present invention is not limited to the above-described embodiments, and modifications, improvements, and the like can be made as appropriate.

For example, in the above-described embodiment, the formation of the notches 25 and 25 is performed after the cup bearing 13a is incorporated in the portion between the circular hole 11c (11d) and the end portion of the shaft portion 12a. However, the invention is not limited thereto.

That is, the formation of the notches 25 and 25 may be performed before the cup bearing 13a is incorporated in the portion between the circular hole 11c (11d) and the end portion of the shaft portion 12a.

When carrying out the present invention, the formation number of notches, the cross-sectional shape, the depth dimension, the formation position (including the radial distance from the inner circumferential surface of the circular hole and the position in the circumferential direction) and the like are not limited to the structure of each of the embodiments described above, and can be appropriately determined, in accordance with the shape, size, position, and the like of the required staking portion. The cross joint type universal joint which is an object of the assembling method of the invention is not limited to the steering device, and can be used in a state of being assembled to a propeller shaft and various torque transmission mechanisms.

This application is based upon and claims the benefit of priority from Japanese Patent Application No. 2016-014097 filed Jan. 28, 2016 and No. 2016-036510 filed Feb. 29, 2016, the entire contents of which are incorporated herein by reference.

DESCRIPTION OF REFERENCE NUMERALS AND SIGNS

1: Steering wheel
2, 2a: Steering shaft
3, 3a: Intermediate shaft
4: Steering gear unit
5: Input shaft
6, 6a, 6b: Universal joint
7a, 7b, 7c, 7d: Yoke
8, 8a: Joint cross
9a, 9b, 9c, 9d: Base
10a, 10b, 10c, 10d: Coupling arm portion
11a, 11b, 11c, 11d: Circular hole
12, 12a: Shaft portion
13, 13a: Cup bearing
14, 14a: Staking portion
15: Steering column
16: Electric assist device
17: Output shaft
18a, 18b: Side plate portion
19: Through hole
20: Cup
21: Needle
23: Bottom portion
24: Inward flange
25, 25a, 25b: Notch
26: Radially outer side surface
27, 27a, 27b, 27c: Thin-walled portion
28: Notched portion

The invention claimed is:

1. A joint cross type universal joint comprising:
a pair of yokes; and
a joint cross which couples the yokes so as to be swingably displaceable, wherein:
the pair of yokes includes a base portion, a pair of coupling arm portions extending in an axial direction from two positions on opposite sides in an radial direction at one end portion of the base portion in the axial direction, and a pair of circular holes formed concentrically with each other at leading end portions of the pair of coupling arm portions;
the joint cross includes four shaft portions provided in a state in which central axes of adjacent shaft portions are orthogonal to each other;
a cup bearing is incorporated in a portion between the circular hole formed in the coupling arm portion and an end portion of the shaft portion of the joint cross;
a notch, having a triangular cross-sectional shape, is formed in a portion near the periphery of the circular hole on an outer side surface of the coupling arm portion;
a staking portion which extends inward in the radial direction from the circular hole to prevent the cup bearing from falling off from the circular hole is formed at an opening edge portion of the circular hole on the outer side surface of the coupling arm portion and on a radially inner portion of the notch; and
the radially outer side surface forming the notch forms an inclined surface which is inclined outward in the radial direction toward the outer side surface of the coupling arm portion.

2. A method of assembling a joint cross type universal joint in which a cup bearing is incorporated in a portion between a circular hole formed in a coupling arm portion forming a yoke and an end portion of a shaft portion forming a joint cross inserted inside the circular hole, and then an opening edge portion of the circular hole on an outer side surface of the coupling arm portion is plastically deformed inward in the radial direction to form a staking portion, wherein:

after a notch is formed in a portion near the periphery of the circular hole on the outer side surface of the coupling arm portion, a wall portion formed in a radially inner portion of the notch in the opening edge portion of the circular hole is plastically deformed inward in the radial direction to form the staking portion;

the radially outer side surface forming the notch forms an inclined surface which is inclined outward in the radial direction toward the outer side surface of the coupling arm portion; and a shape of the notch opened to the outer side surface of the coupling arm portion is a triangular shape.

3. The method of assembling the joint cross type universal joint according to claim 2, wherein the formation of the notch is performed after the cup bearing is assembled in the portion between the circular hole and the end portion of the shaft portion.

4. The method of assembling the joint cross type universal joint according to claim 2, wherein the formation of the notch is performed before the cup bearing is incorporated in the portion between the circular hole and the end portion of the shaft portion.

5. The method of assembling the joint cross type universal joint according to claim 2, wherein after a plurality of notches are formed in the portion near the periphery of the circular hole on the outer side surface of the coupling arm, a plurality of wall portions formed in each of the radially inner portions of the plurality of notches among the opening edge portions of the circular hole are simultaneously plastically deformed inward in the radial direction.

6. The method of assembling the joint cross type universal joint according to claim 2, wherein after an annular notch which surrounds the circular hole is formed in the portion near the periphery of the circular hole on the outer side surface of the coupling arm portion, an annular wall portion formed in the opening edge portion of the circular hole is plastically deformed inward in the radial direction in the radially inner portion of the notch.

\* \* \* \* \*